United States Patent
Barnett et al.

(10) Patent No.: US 8,397,383 B2
(45) Date of Patent: Mar. 19, 2013

(54) ANNULAR GAS TURBINE ENGINE CASE AND METHOD OF MANUFACTURING

(75) Inventors: Barry Barnett, Markham (CA); Steven Hunt, Oakville (CA); Czeslaw Wojtyczka, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1661 days.

(21) Appl. No.: 11/537,884

(22) Filed: Oct. 2, 2006

(65) Prior Publication Data

US 2008/0086880 A1 Apr. 17, 2008

(51) Int. Cl.
*B21K 25/00* (2006.01)
(52) U.S. Cl. .......................... 29/889.2; 60/796
(58) Field of Classification Search .................. 29/889.2, 29/890.01, 509; 60/226.1, 796
See application file for complete search history.

(56) References Cited

U.S. PATENT DOCUMENTS

| 4,765,167 | A | * | 8/1988 | Sampson | 72/68 |
| 5,355,722 | A | * | 10/1994 | Socier | 72/82 |
| 5,718,311 | A | * | 2/1998 | Victoria et al. | 192/3.28 |
| 5,806,358 | A | * | 9/1998 | Rolf | 72/68 |
| 7,266,941 | B2 | * | 9/2007 | Eleftheriou et al. | 60/226.1 |
| 7,370,467 | B2 | * | 5/2008 | Eleftheriou et al. | 60/226.1 |
| 7,565,796 | B2 | * | 7/2009 | Eleftheriou et al. | 60/226.1 |
| 2005/0022501 | A1 | * | 2/2005 | Eleftheriou et al. | 60/226.1 |
| 2008/0080974 | A1 | * | 4/2008 | Savoie et al. | 415/200 |
| 2008/0086881 | A1 | * | 4/2008 | Eleftheriou et al. | 29/889.2 |
| 2008/0086882 | A1 | * | 4/2008 | Eleftheriou et al. | 29/889.2 |

* cited by examiner

*Primary Examiner* — David Bryant
*Assistant Examiner* — Ryan J Walters
(74) *Attorney, Agent, or Firm* — Norton Rose Canada LLP

(57) ABSTRACT

The method is used for making an annular gas turbine engine case from a preform. The method comprises comprising flowforming at least one section of the preform, and then outwardly bending at least one portion of the perform.

6 Claims, 6 Drawing Sheets

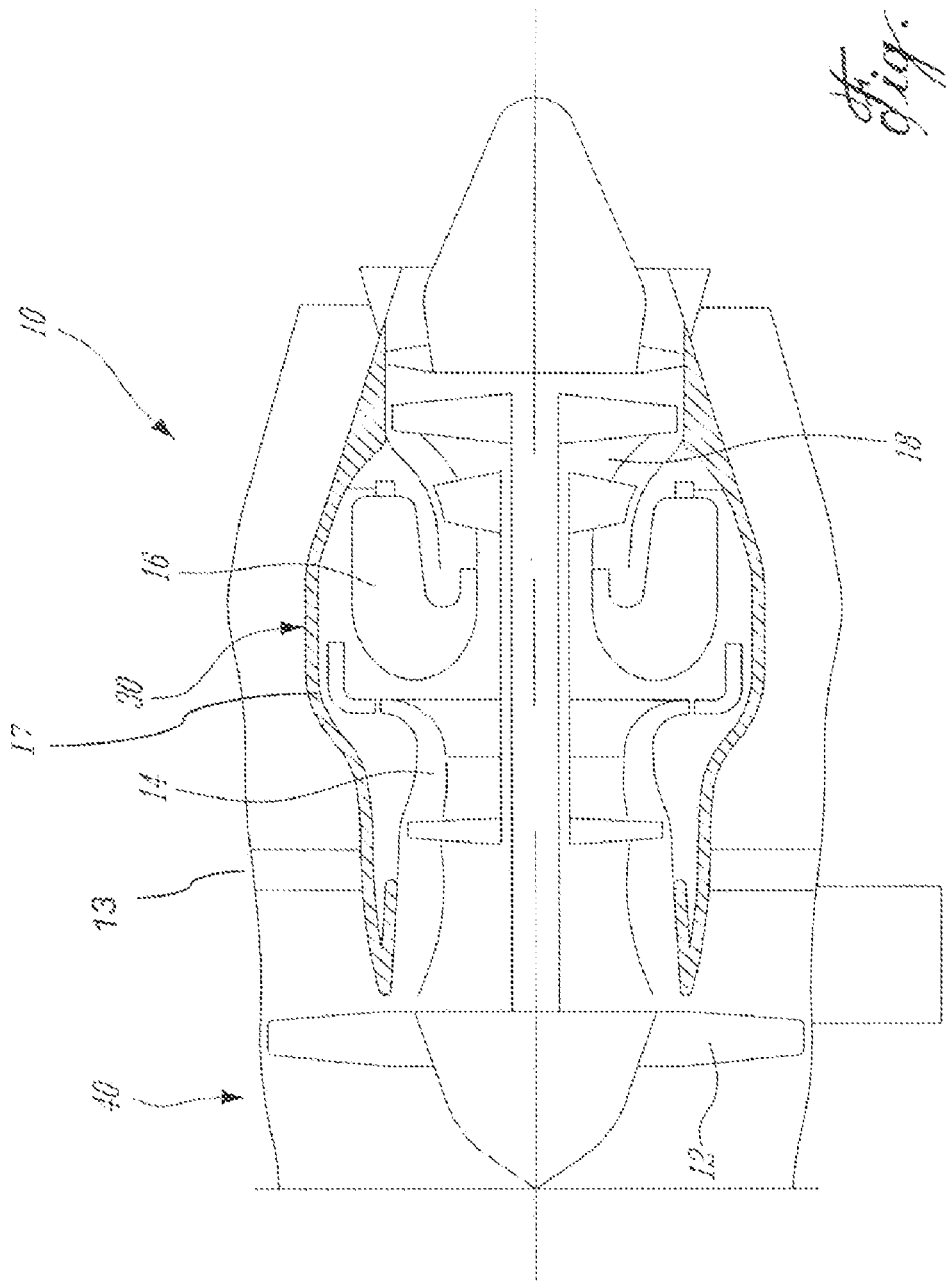

US 8,397,383 B2

ANNULAR GAS TURBINE ENGINE CASE AND METHOD OF MANUFACTURING

TECHNICAL FIELD

The invention relates to an annular gas turbine engine case and a method of manufacturing the same.

BACKGROUND

Although unlikely, it is possible that during operation of a gas turbine engine a rotating airfoil can fail by separating from the hub or disc and being released in a radial direction. A surrounding containment structure is designed to capture the released airfoil and prevent it from leaving the engine, in either the radial or axial direction. The containment structure must be strong, and for airborne applications, lightweight. It is also desirable, of course, to provide components as cost effectively as possible. A turbofan fan case is one example of an airfoil containment structure, and a compressor or gas generator case is another example. In addition to performing a containment function, a gas generator case is also a pressure vessel.

Traditionally, a fan case is manufactured by machining a forging, but this wastes much material, and requires several steps, and therefore time. Traditionally, a gas generator case is machined out of two or three forged or sheet metal rings, provided to meet the various thickness requirements and design intents, then these rings are welded together. However, the weld joint(s) must to be located in a region away from the fragment trajectory of the impeller blade, since weld lines are not desired in containment sections of components. All these steps are time consuming and therefore increase lead-time. It is desirable to provide improved ways for manufacturing annular gas turbine engine cases in effort to reduce lead-time and manufacturing costs.

SUMMARY

In one aspect, the present concept provides a method of manufacturing an annular gas turbine engine case from a preform, the method comprising: flowforming at least one section of the preform to provide an annular case; outwardly bending a distal end of the case to provide a radially-extending flange; and outwardly bending another distal end of the case to provide a radially-extending flange.

In another aspect, the present concept provides an annular gas turbine engine case comprising: at least one flowformed section; and at least one outwardly bent portion at each distal end thereof.

Further details of these and other aspects will be apparent from the detailed description and figures included below.

BRIEF DESCRIPTION OF THE FIGURES

For a better understanding and to show more clearly how it may be carried into effect, reference will now be made by way of example to the accompanying figures, in which:

FIG. 1 schematically shows a generic turbofan gas turbine engine to illustrate an example of a general environment in which annular gas turbine engine cases can be used;

DETAILED DESCRIPTION

Figure 2A:
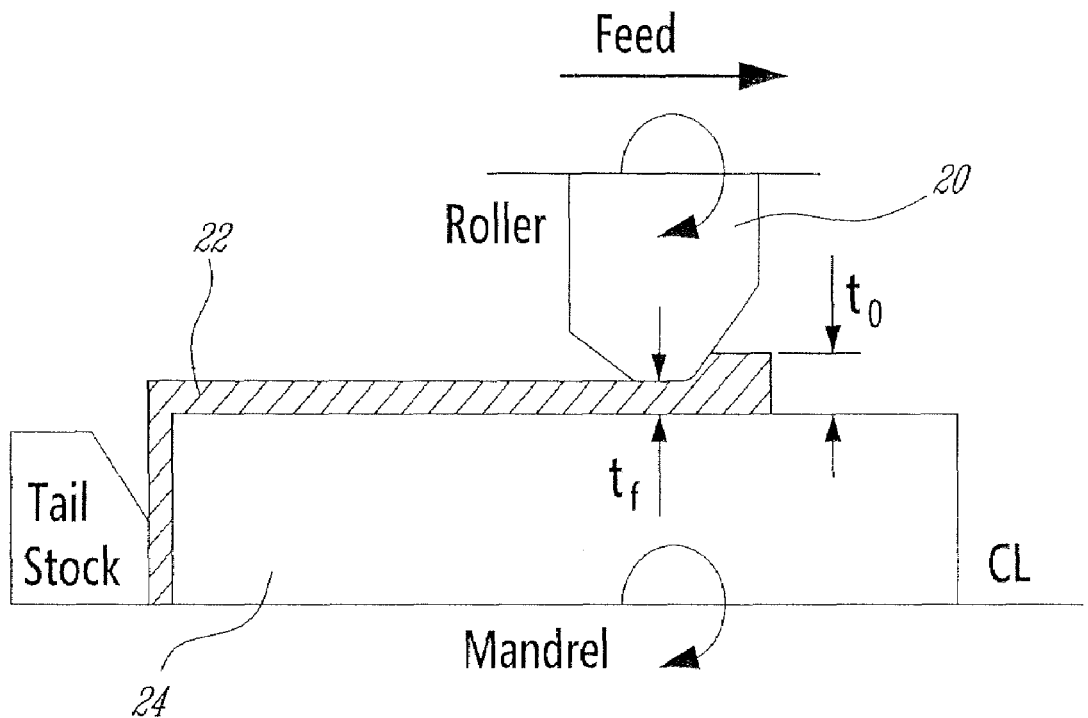
FIGS. 2a and 2b schematically illustrate the principles of flowforming.

FIG. 1 illustrates a turbofan gas turbine engine 10 of a type preferably provided for use in subsonic flight, generally comprising in serial flow communication a fan 12 through which ambient air is propelled, a fan case 13 surrounding the fan, a multistage compressor 14 for pressurizing the air, a combustor 16 in which the compressed air is mixed with fuel and ignited for generating an annular stream of hot combustion gases, a gas generator case 17 surrounding at least a portion of compressor 14 and combustor 16, and a turbine section 18 for extracting energy from the combustion gases. Fan case 13 and gas generator case 17 are preferably manufactured using flowforming techniques, as will be described further below.

Figure 2B:
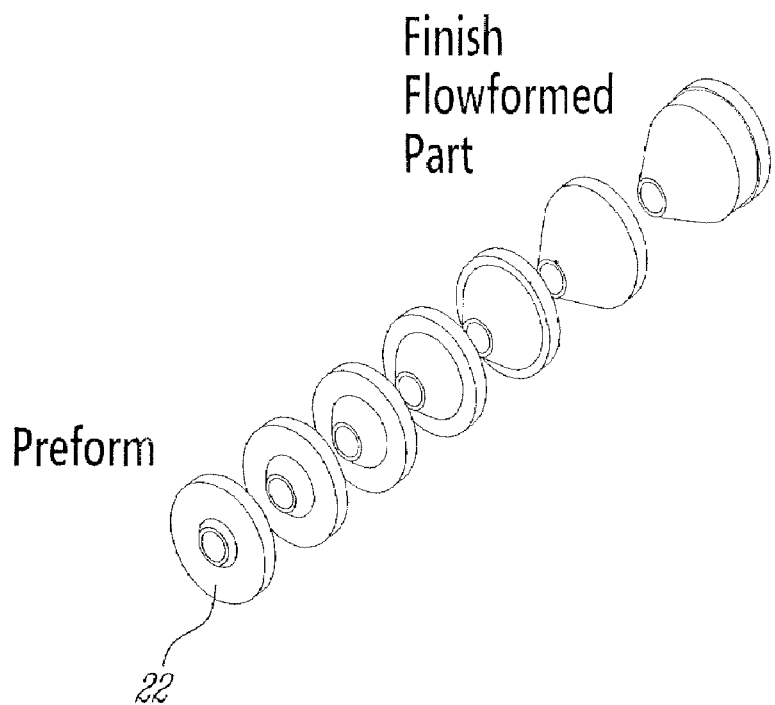

As schematically shown in FIGS. 2a and 2b, flowforming generally involves applying a compressive force using rollers 20 on the outside diameter of a rotating preform 22 (also called a blank) mounted on a rotating mandrel 24. The preform 22 is forced to flow along the mandrel 24, for instance using a set of two to four rollers 20 that move along the length of the rotating perform 22, forcing it to match the shape of the mandrel 24. The process extrudes and therefore thins or reduces the cross-sectional area of the wall thickness of the rotating perform 22, which is engineered to produce a cylindrical, conical or contoured hollow shape. The thickness of the finished part is determined by the gap that is maintained between the mandrel 24 and the rollers 20 during the process, and therefore the final thickness of the part may be controlled. This gap can be changed or remain constant anywhere along the length of the part, to thereby change or maintain part thickness, as desired.

Figure 3A:
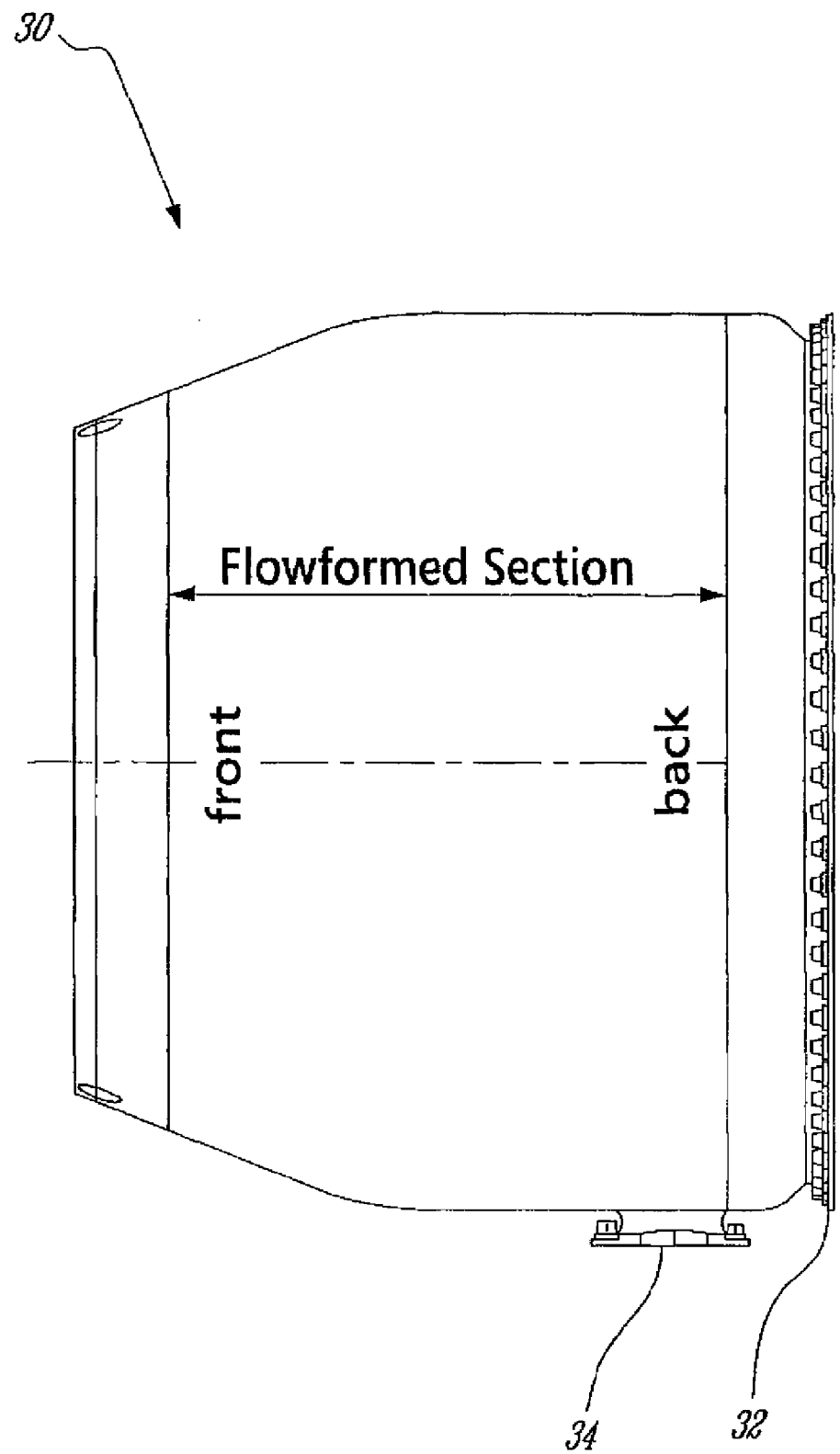
FIG. 3a is a side view of an example of a gas generator case and 3b is a cross-section view of a portion of a gas generator case.
Figure 3B:
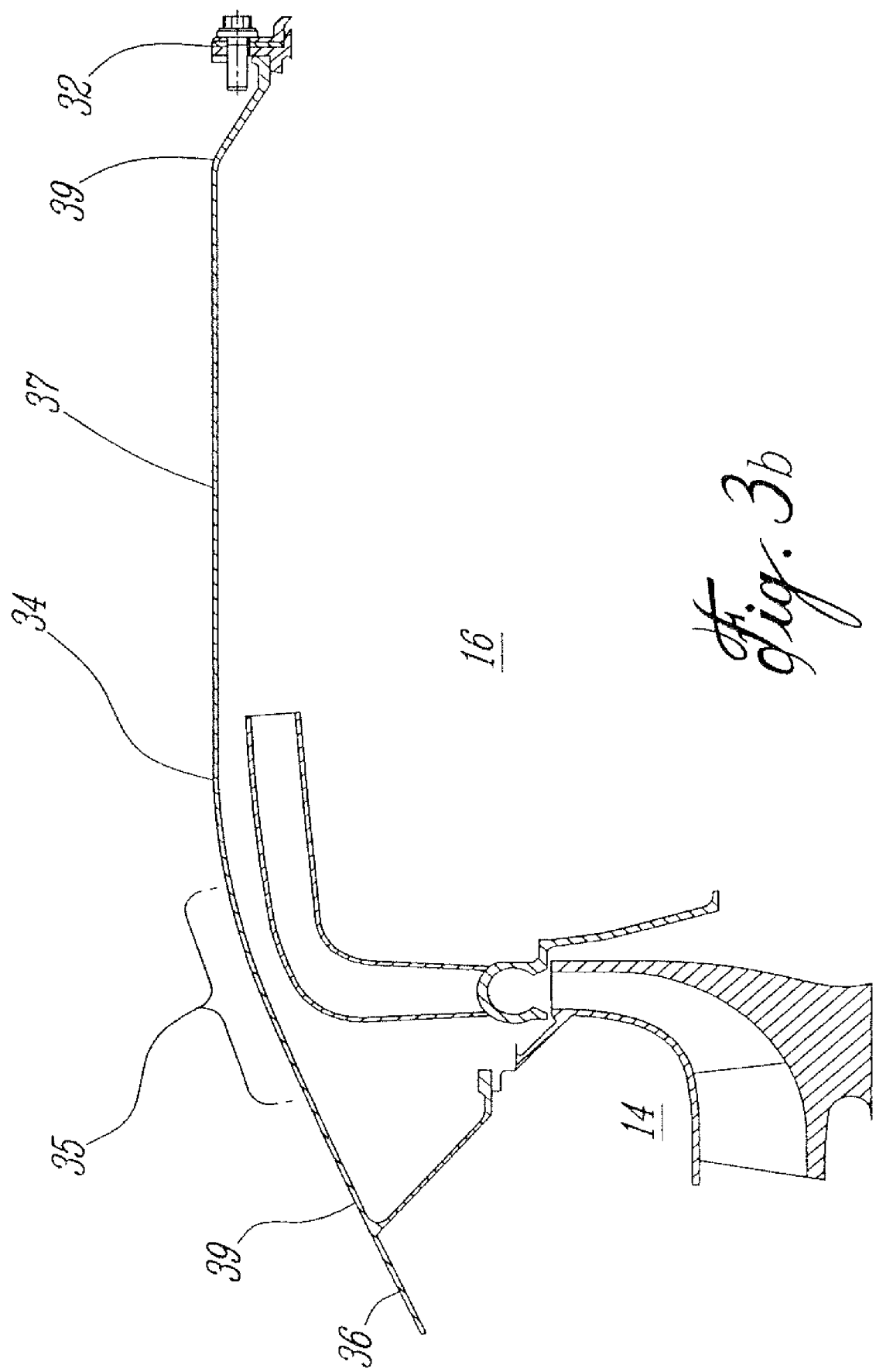

FIGS. 3a and 3b show an example of a flowformed gas generator case 30. The case includes a rear flange portion 32, a central flowformed section 33 and a front flange portion 36. Central flowformed section 33 includes a containment portion 35 and a gas generator portion 37. As will be appreciated, the limitations of flowforming are such that the gas generator case 30 cannot be flowformed in its entirety as a single piece. Therefore, rear flange portion 32 and front flange portion 36 are joined by welds 39 to central flowformed section 33. The thickness of the central flowformed section 33 varies along the central section 33, from an area of increased thickness corresponding to containment portion 35, decreasing smoothly to a smaller thickness corresponding to a gas generator portion 37. More material is thus provided where needed for containment, and less material where not required for the pressure vessel portions. The thickness of gas generator portion is designed to handle the high pressure compressor exit pressure (so-called "P3" pressure, whereas the thicker portion of containment portion 35 is sized to contain any high energy fragments from the compressor impeller blades in addition handling P3 pressure. Central flowformed section 33 has a generally conical or cylindrical shape, to facilitate mandrel removal after flowforming. An example material is ferritic/martensitic stainless steel SS410.

A traditional way to provide a gas generator case is to machine the case out of two or three forged rings sized to meet the various thickness requirements, an then weld these rings together. Using flowforming reduces the costs significantly and reduces the number of welds, which are undesirable in high temperature and high pressure environments. Since only a section of the gas generator case 30 of this design could be flowformed, the rear flange portion 32 may be provided, for example, by outwardly bending the perform using a press, or by machining rear flange portion 32 from a ring, etc. Also, an non-axisymmetric detail 34 was later joined at the bottom of the flowformed section using a suitable method, such as welding.

The preform for the gas generator case may be obtained from any suitable process, such as deep drawing or stamping a cold rolled and annealed sheet. Where a stamped circular blank or flat plate is used, the blank is thicker than the thickest final portion of the case. The blank is preferably cold worked to introduce compressive stresses into the material. During the flowforming process, material is displaced by shear force over the spinning mandrel to produce a variable thickness case. The central section 33 of the case is flowformed, preferably in one pass, using a two-roller flowforming machine (not shown). Preferably, a full anneal then follows to recrystallise the microstructure.

After forming/machining and assembly, the case is preferably also hardened-tempered to give the material its final properties, including obtaining the desired microstructure and hardness.

Figures 4A, 4B:
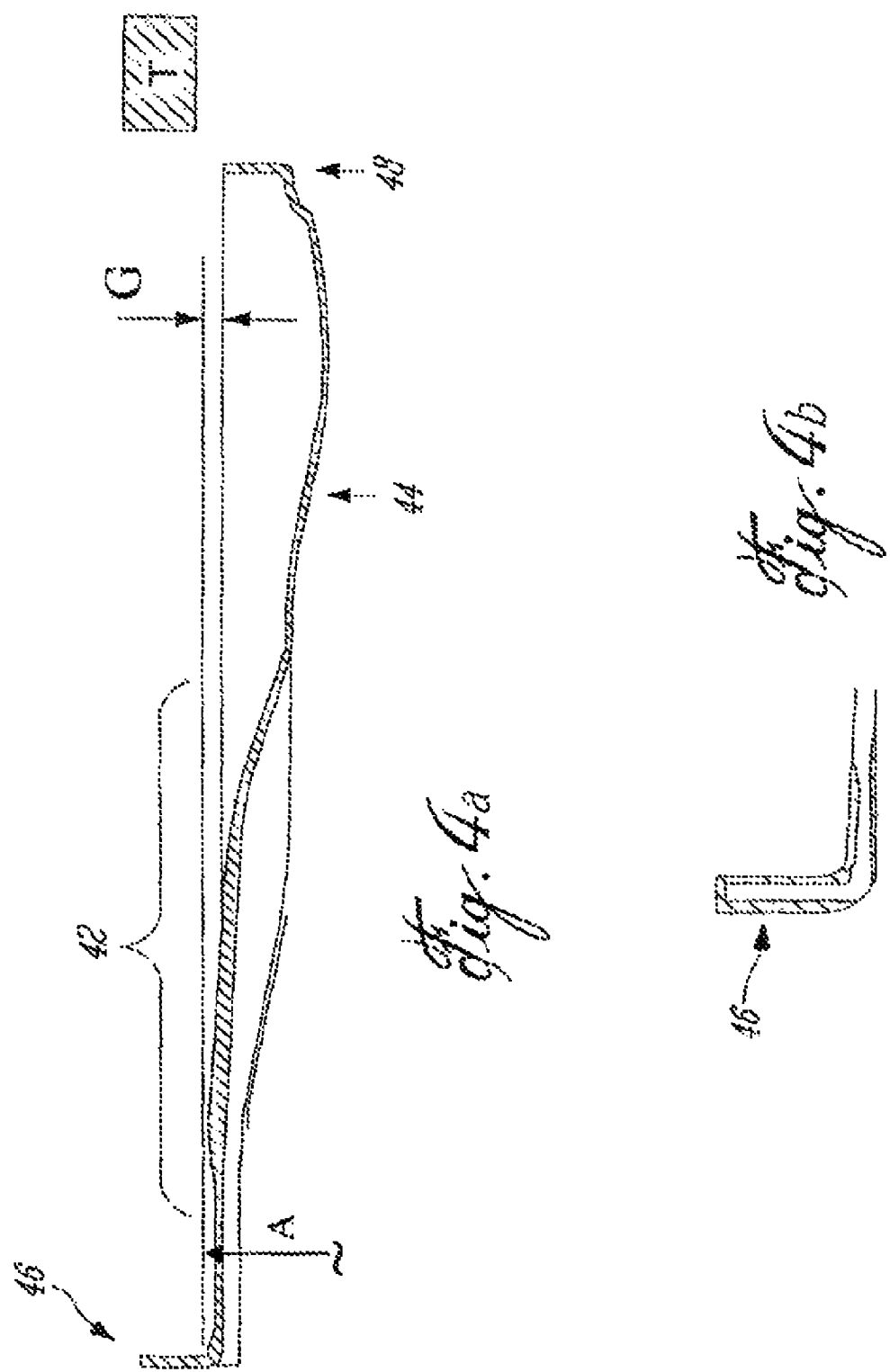
FIG. 4a is a cross-section view of a portion an example of a fan case.
FIG. 4b is an enlarged portion of an example of a fan case.

FIG. 4a shows an example of a fan case 40. The fan case 40 is typically a containment part which is one piece and without welds in the containment zone, as welds undesirably weaken the part in containment areas, and thus are avoided. The thickness of the fan case 40 varies along the part, depending on the local resistance requirements to minimize weight and the expected trajectory of high energy fragments, as will be discussed further below. An example material used is an austenitic stainless steel with high yield strength and excellent ductility even at low temperatures, such as Nitronic 33.

At least two different areas are provided, namely a containment area 42 having a first thickness and a non-containment area 44 having a second thickness less than the first thickness, to lower the overall weight. Accordingly, the first and second average thicknesses are different. The fan case is otherwise preferably smooth and continuous, with no abrupt changes or discontinuities in shape. Flanges 46 and 48 are provided, as discussed below.

A circular plate is preferably flowformed to a desired thickness(es). Preferably, suitable treatments to harden (e.g. by solid solution, etc.) and anneal the case are made after flowforming.

After flowforming, the flanges 46, 48 are provided by outwardly bending the two extremities of the flowformed shell using a suitable tool (not shown). In order to facilitate providing flanges on both ends of the same part, the fan case design includes a clearance gap "G" Provided between diameter A (the outside diameter of the case 40 at the base of flange 46) and the outside diameter of the flange 48, in order to permit annular tooling T to fit over the rear flange 48 to support case 40 when bending front flange 46 into place. Thus, fan case 40 is provided within constraints on the diameters of the case at the base of flange 46 and the outside diameter of flange 48. Although not required or desired in this embodiment, flanged portions may alternately be welded to a flowformed portion of fan case 40. Referring to FIG. 4b, after bending, the case may be machined from the original thickness (outside line) to a desired final shape and thickness (inside line). Preforms used for the flowforming may be provided in any suitable manner. Although a stamped circular sheet is the desired manner, preforms may also be shaped by deep drawing, or by machining a forged or cast bar, or any other suitable manner.

Flowforming, however, can only generate axisymmetric shells or the like. Bosses, stiffeners or welding lips cannot be provided using these techniques. Furthermore, flanges cannot always be obtained, even after considering subsequent forming steps such as bending and rolling/necking. For these reasons, such details are preferably provided using other techniques, such as machined out of forged rings, and then attached to the flowformed shell, as will now be described.

Figure 5A:
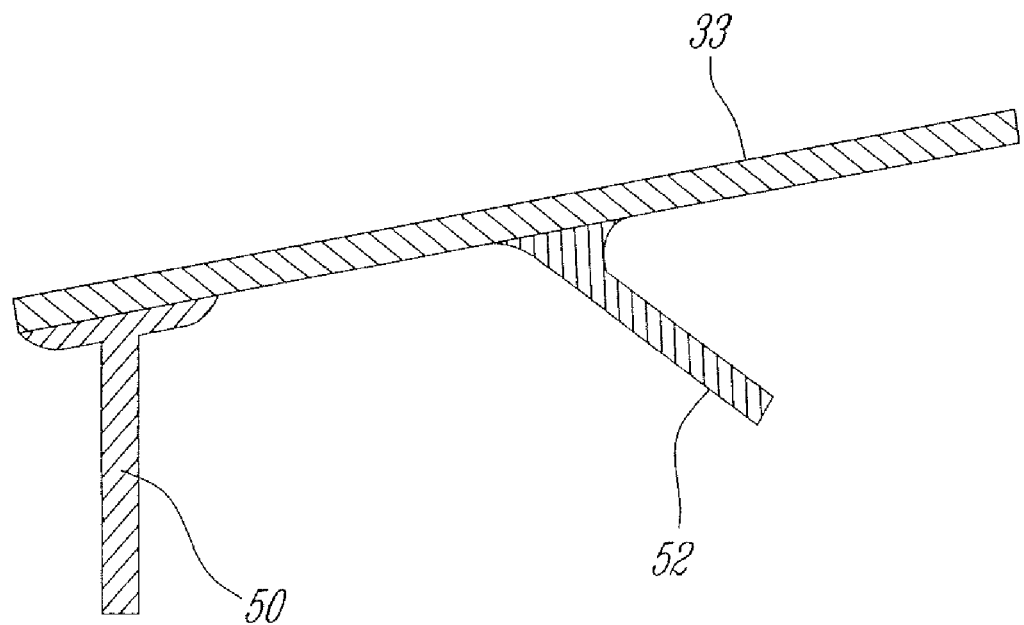
FIGS. 5a and 5b are cross-section views of portions of example cases.

FIG. 5a shows examples of additional elements 30, 32 added to a flowformed shell 33 of FIGS. 3a and 3b. The base metal of flowformed shell 33 is relatively thin, and so preferably heat input is limited to avoid distortion. The applicant has found that laser deposition using a powder may be used to deposit material on shell 33 which provides a compromise must be reached between precision and speed to ensure the final cost will be competitive with machining. Other processes, such as TIG deposition are possible but may not be preferred, depending on the shell thicknesses present, since too much heat may result in distortion of the shell 33. Although very high precision deposition may be used, it is currently a slow process, and therefore, in the example of FIG. 3, the added elements 50, 52 are preferably roughly deposited, and then machined to final dimensions to ensure appropriate filet radii and surface finish. Adding material by laser deposition is more economical than casting or forging and then removing unwanted material. Deposition process would eliminate material waste and welding steps.

Figure 5B:
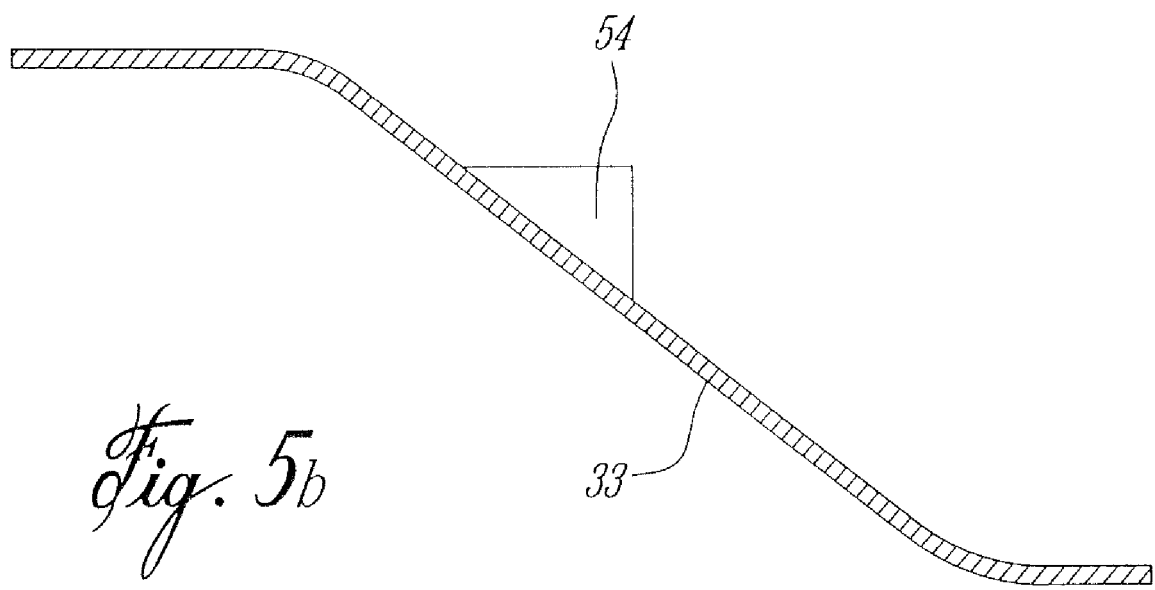

Referring to FIG. 5b, a boss 54 are made separately and added by brazing to the flowformed shell 33. The flowformed shell is therefore kept intact where welds are not accepted. Therefore, flowforming can be a very advantageous alternative to other known techniques for the manufacturing of gas turbine case components. It permits reduced cost and weight relative to other methods, eliminates the need for axial welds, and helps reduce or eliminate the number of circumferential welds required.

The above description is meant to be exemplary only, and one skilled in the art will recognize that other changes may also be made to the embodiments described without departing from the scope of the invention disclosed as defined by the appended claims. For instance, the present invention is not limited to gas generator case and fan case components exactly as illustrated herein. Also, the gas turbine engine shown in FIG. 1 is only one example of an environment where aircraft engine components can be used. They can also be used in other kinds of gas turbine engines, such as in the gas generator cases of turboprop and turboshaft engines. The various materials and dimensions are provided only as an example. Still other modifications which fall within the scope of the present invention will be apparent to those skilled in the art, in light of a review of this disclosure, and such modifications are intended to fall within the appended claims.

What is claimed is:

1. A method of manufacturing an annular gas turbine engine case from a preform, the method comprising:
   flowforming at least one section of the preform to provide an annular case;
   outwardly bending a distal end of the case to provide a radially-extending flange;
   outwardly bending an other distal end of the case to provide a radially-extending flange: and
   fitting an annular tool over one of the distal ends and onto a selected portion of an outer radial surface of the annular case in an axial direction prior to bending at least one of the distal ends for supporting the annular case, the a selected portion of the outer radial surface having a diameter greater than an outer diameter of one of the radially-extending flanges for being supported by the annular tool.

2. The method as defined in claim 1, further comprising, the step of flowforming the preform to provide the case with a diameter which change's from one said distal end to the other.

3. The method as defined in claim 2, wherein said outer diameter is at the other said-distal end, and wherein a diameter at one said distal end is larger than said outer diameter of said flange at the other distal end.

4. The method as defined in claim 3, further comprising the step of removing the annular tool by passing over said outer diameter of said flange.

5. The method as defined in claim 1, further comprising:
machining at least one surface of one of said flanges.

6. The method as defined in claim 1, wherein the annular gas turbine engine case is a fan case.

* * * * *